US008641952B2

(12) United States Patent
Kretschmer et al.

(10) Patent No.: US 8,641,952 B2
(45) Date of Patent: Feb. 4, 2014

(54) FIBER-REINFORCED COMPONENT FABRICATION WITH MOLD CORES (75) Inventors: Tom Kretschmer, Koenigsbrueck (DE); Steffen Kunze, Vagen (DE); Christian Wellhausen, Ottobrunn (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 649 days.

(21) Appl. No.: 12/505,608

(22) Filed: Jul. 20, 2009

(65) Prior Publication Data

US 2010/0015435 A1    Jan. 21, 2010

(30) Foreign Application Priority Data

Jul. 21, 2008 (DE) .................. 10 2008 034 203

(51) Int. Cl.
*B29C 33/40* (2006.01)
(52) U.S. Cl.
USPC ............................ 264/236; 264/257; 264/258
(58) Field of Classification Search
USPC .......................... 264/236, 257, 258
See application file for complete search history.

(56) References Cited

U.S. PATENT DOCUMENTS 2,613,397 A * 10/1952 Borkland ...................... 264/316
3,879,160 A *  4/1975 Miller ......................... 425/405.2
4,698,011 A    10/1987 Lamalle et al.
2003/0234474 A1* 12/2003 Williams ...................... 264/553
2009/0309268 A1 12/2009 Cavaliere et al.

FOREIGN PATENT DOCUMENTS

| DE | 10342867 A1 | 4/2005 | |
| DE | 102005011930 B3 * | 9/2006 | ............. B29C 33/28 |
| EP | 0171325 A1 | 2/1986 | |
| FR | 2898538 A1 | 9/2009 | |
| GB | 2006092 A | 5/1979 | |

OTHER PUBLICATIONS

French Search Report Dated Jul. 29, 2013, Application No. FR0903513, Applicant Eurocopter Deutschland GmbH, 2 pages.

* cited by examiner

*Primary Examiner* — James Sanders
(74) *Attorney, Agent, or Firm* — Brooks Kushman P.C.

(57) ABSTRACT

A method of fabricating components (23) based on fiber-reinforced plastics material, in particular with the help of a wrapped mold core (10), includes the following steps:
a) fabricating the mold core (10); b) wrapping the mold core (10) with a wrapper (14) that withstands resin; c) applying fiber semi-finished products (16) and introducing resin to create the plastics component (23); and d) hardening the plastics component (23) under the effect of temperature; which method is improved by the fact that, under all circumstances, and during hardening in step d), substantial pressure equilibrium is established across the fiber semi-finished product (16, 20) between ambient pressure ($p_u$) and the pressure ($p_k$) inside the core. A device is also described.

12 Claims, 5 Drawing Sheets

FIBER-REINFORCED COMPONENT FABRICATION WITH MOLD CORES

The present invention relates to a method of fabricating components based on fiber-reinforced plastics material, in particular with the help of a wrapped mold core, in which internal pressure rises in the mold core during the fabrication method because of the temperature rise, the method presenting the following steps:

a) fabricating the mold core;
b) wrapping the mold core with a wrapper that withstands resin;
c) applying fiber semi-finished products and introducing resin to make the plastics or synthetic component; and
d) hardening the plastics or synthetic component under the effect of temperature.

The method in accordance with the invention is also applicable to forming pre-forming elements or to a pre-forming method.

The invention also provides a device for fabricating components based on fiber-reinforced plastics material by using a solid or soluble wrapped mold core for implementing the method.

Mold cores based on a moldable mass and possibly also a surrounding wrapper are generally used for fabricating fiber-reinforced hollow components or fiber-reinforced plastics material components (FRP components) for the purpose of occupying a cavity in the hollow component during fabrication. Such cores also serve as an inner tool for fiber semi-finished products for textile semi-finished products, which in this application includes products that are preimpregnated, and/or for making hardened laminates.

The fabrication of a water soluble mold core is described in document DE 10 2005 011 930 B3, for example. According to that document, a water soluble moldable mass is used to fabricate a mold core that is then surrounded with a vacuum film. The vacuum film is water resistant and prevents resin from penetrating into the core. Otherwise, the future plastics component would detach poorly from the core and its inside facing the core would have a surface with unwanted irregularities. The soluble mold core is wrapped for this purpose with a fiber semi-finished product and a resin that constitutes a matrix, which resin is subsequently hardened under the effect of temperature. For the fiber semi-finished product, it is also possible to use a fiber semi-finished product that is already preimpregnated with resin, i.e. it is possible to use a preimpregnated material. The mold core as an inner tool is treated together with an outer tool on one or two sides, e.g. a solid mold or a vacuum film, by vacuum infusion means, by resin transfer molding (RTM) methods, or by other known fabrication methods. Similarly, the application of the resin and of the fiber semi-finished product is of secondary importance. This operation may be performed manually or by machining in a molded tool.

The resin is generally hardened under the effect of temperature. For this purpose, the fabrication structure is heated to satisfy the hardening parameters of the resin system used. If the mold core is sealed suitably for fabrication, i.e. wrapped in a wrapper that prevents resin from penetrating into the core, the pressure inside the mold core rises during heating of the fabrication structure since the matter that remains inside the mold core, in particular air, expands under the effect of the heating during the hardening process.

Nevertheless, the properties of the component and those of the fiber semi-finished product may be influenced unfavorably by pressure rising inside the core. When the core wrapper is gastight, the wrapper may inflate and the fiber semi-finished product may then deform. The future component thus presents significant dimensional errors. Furthermore, the fiber volume content and the permeability of the still-dry fiber semi-finished product may vary when the mold core expands even while adjusting the infusion temperature, thereby compressing the layers of the fiber semi-finished product with unwanted force. As a result, it is possible that locations that are dry will be formed in the laminated or fiber semi-finished product because no resin or not enough resin diffuses therein. Without countering this effect, adequate fabrication of fiber-reinforced components is not possible within the present state of the art using a vacuum infusion method, e.g. the vacuum-assisted process (VAP), the melt volume index (MVI) process, the Seeman composites resin infusion molding process (SCRIMP), or the vacuum-assisted resin infusion (VARI) process. The sealing may be damaged by the rise of the inside pressure. As a result, the material coming from the core may penetrate into the fiber semi-finished product, thereby contaminating it. Conversely, material from the fiber semi-finished product may penetrate into the core and make it difficult to detach the core material.

In document DE 10 342 867 A1, there is described a method of fabricating a water soluble mold core that is surrounded by semi-permeable core sealing. The sealing is continuous for gas but not for liquids. If, after the fiber semi-finished product has been impregnated with resin, a new increase of pressure in the core occurs in the fabrication method, e.g. by the fabrication structure being heated to a hardening temperature higher than the infusion temperature, then gas from the core may penetrate into the fiber semi-finished product. That can lead to porosity or to an increase in the porosity of the laminate or the fiber semi-finished product.

The object of the invention is thus to fabricate fiber-reinforced components using mold cores in which said problems do not appear.

According to the invention, this object is achieved by the method specified in the introduction, by the fact that, under all circumstances and during the hardening of step d), pressure equilibrium is essentially established across the plastics component between ambient pressure and the pressure inside the core. In the fabrication method, pressure balancing may be essential or it may also be adjusted beforehand. A significant drop in pressure is thus avoided between the spaces on either side of the wall of the plastics component, i.e. its side facing towards the mold core and touching it, and its side opposite therefrom. The invention follows the principle of avoiding any significant pressure variation or pressure difference between an inside space surrounded by the component and the surroundings that are separated from said inside space by the wall of the component, with this continuing to be true even when the temperature is raised while hardening the resin. This does not apply to any pressure conditions inside the wall of the component or the fiber semi-finished product, e.g. while fabricating the component by means of a vacuum process.

The pressure equilibrium on the fiber semi-finished product should serve in particular to prevent the core rising in pressure relative to the ambient pressure of the fiber semi-finished product so as to avoid deforming the component. The pressure may be shifted so as to establish suction inside the core, since if there is suction inside the core the core wrapper then presses against the mold core so that no bubbles or creases are formed. Suction guarantees that the wrapper surrounding the mold core is pressed tightly thereagainst and does not lead to accidental errors of shape or dimension in the component, e.g. by bubbles forming in the wrapper. Thus, the invention provides a simplified fabrication method for one-piece hollow components that then do not need to be made by assembling half-shells together, for example. Thus, both assembly points and the expense of the corresponding assembly can be avoided. By omitting assembly points, a fiber-reinforced plastics shell can be fabricated that is undisturbed, in particular concerning the paths of the fibers over the entire hollow component.

The inventive method is advantageous for any core surrounded by a wrapper. This is equally applicable with cores that are soluble and with cores that are not soluble. Insoluble cores are generally wrapped using a structure having open pores or a honeycomb structure. Depending on requirements, the wrapper may be adhesively bonded separately with the core. Soluble mold cores should be understood as generally comprising mold cores that are water soluble. The moldable mass of the cores and optionally only certain components of the moldable mass such as a binder, are soluble. Nevertheless, for simplification purposes, the moldable mass and/or the mold cores are said to be soluble. Furthermore, it is also possible to envisage using solvents other than water, for example toluene and moldable masses suitable therefor. Without excluding such possibilities, the description of the invention refers specifically to water as the solvent.

In principle, three options may be presented for generating pressure equilibrium across the fiber semi-finished product between the inside space and the outside space of the component during the fabrication method in the event of temperature rising. In an advantageous first design of the invention, equilibrium is achieved by the pressure inside the core being reduced. In order to avoid a pressure unbalance between the inside space of the component and its wrapper, and according to the invention, the pressure inside the core is eliminated. There is thus no need on the outside of the core to take other measures to achieve pressure equilibrium or to absorb the forces that result from excess pressure inside the mold core.

This phenomenon may arise in a first advantageous variant of this principle by the fact that, in particular during hardening in step d), extra pressure that arises inside the core is discharged to the surroundings. A pressure balance is thus established between the "inside" and the "outside" by connecting the space inside the core to the surroundings. For this purpose, it is necessary to pierce the resin-withstanding wrapper that is generally also gas-tight, and to establish a pipe connection between the space inside the mold core and the surroundings of the component. Thus, there is no need to perform any specific prior calculation to determine the pressure that will eventually become established inside the core, since pressure is balanced automatically because of the pipe connection between the space inside the core and the surroundings. With suitable technical equipment, this pressure may optionally be modifiable and controllable. The invention thus provides a fabrication method in which, when pressure becomes established inside the core, there is an option of allowing the inside volume of the core to expand to eliminate the pressure such that substantially identical pressure conditions exist on both sides of the component walls. Piercing the wrapper and the fiber material leaves an opening through the component and after the component has hardened, which opening can advantageously be used for detaching the mold core.

In another variant of the principle of eliminating pressure inside the core, it is possible to establish suction inside the mold core after the mold core has been covered, and to maintain suction at least throughout the duration of the fabrication method. In this variant, the invention thus proposes a "negative pressure prestress" so as to balance a pressure that becomes established subsequently. The suction to be set in the mold core needs to be selected as a function of surrounding conditions and of the hardening temperature. By way of example, under normal conditions, it is possible to select suction of about 600 millibars (mbars) (absolute) for a hardening temperature of 180° C. The space inside the mold core is thus significantly evacuated for this purpose using methods that are already known. In order conserve the vacuum, the mold core may be made in self-sealing manner or it may be surrounded by sealing, e.g. of the lacquer type, or by an evacuated film. As a result, the cost of fabricating the wrapped mold core may possibly begin by being slightly increased. Nevertheless, as the fabrication method proceeds, and in particular while the resin is hardening, the space inside the mold core remains completely independent of the surroundings concerning its pressure conditions. After the mold core has been mounted, it is therefore no longer necessary or useful to take any other measures to achieve the pressure balance. The mold core can thus be processed without other known modifications. While the core is being wrapped with a vacuum film, the evacuated mold core may also be monitored visually or with equipment for measuring the degree of sealing of the wrapper after the vacuum has been maintained for a defined length of time.

A second option is to establish pressure conditions that are more or less balanced between the inside of the plastics component or the mold core and the surroundings, by establishing a counterpressure. In another advantageous design of the invention, it is thus possible during step d), when pressure is rising inside the core, to establish an ambient pressure that at least matches or is slightly greater than the inside pressure. Pressure "balance" need not be interpreted strictly in this context, since the desired effect can be achieved even with a small quantity of pressure inside the core. Under all circumstances, the potential pressure that might become established inside the core is calculated in advance so as to be able to set the required counterpressure from the outside in appropriate manner. A counterpressure may be applied in a pressure chamber. That does not represent any significant extra expense in the method of fabricating fiber-reinforced components in an autoclave, since in such a method ambient pressure is needed to adjust an essential fiber volume fraction. The autoclave is thus also used to generate an ambient pressure that corresponds to the pressure inside the core and to obtain a pressure balance across the component.

Another advantageous design of the invention makes use of a third principle whereby, in step b), the mold core is surrounded with a wrapper that is pressure-stable. Consequently, in the method of fabricating the component, pressure does not have any influence on the space inside the mold and on the space inside the component or on the other side, i.e. the surroundings. Instead, the core is wrapped with a wrapper that withstands the inside pressure of the core without deforming. This serves to avoid negative consequences, and in particular any change in the shape of the core. The technique of installing pressure and the measurements taken of the mold core or of the fabrication structure can thus be completely omitted.

In an advantageous design of the invention, the wrapper may be firmly secured to the core. The moldable mass of the core thus takes up the load that is applied as a result of its inside pressure. For this purpose, it is necessary to guarantee sufficient adhesion of the wrapper on the core to ensure that the wrapper cannot become even partially detached under the effect of pressure, since that would lead to it deforming or becoming damaged. The connection between the pressure-stable wrapper and the moldable mass of the mold core thus needs to be made in such a manner that the traction forces that result from the pressure inside the core can be transmitted in full to the wrapper via the contact area between the wrapper and the mass.

In an alternative design of the invention, the wrapper of the mold core may be made with sufficient self-stability. The wrapper may be made for example using materials that are known from the lining technique for fabricating internally-coated tanks, e.g. tanks that are metal-coated. Consequently, the stability of the moldable mass is of little significance and it may also present little strength, since the moldable mass does not bear the load, that results from the pressure inside the core. The above-mentioned problem of force transmission at the connection between the mass and the wrapper cannot occur here because the wrapper is sufficiently stable to receive the forces that appear.

Cores that are solid, and thus insoluble, generally remain within the component that surrounds them. For example, to save weight, it is possible to use cores that are soluble and that are dissolved in a separate step out from the component. They are wrapped in wrapping that withstands resin so that the resin does not become associated with the moldable mass of the core and make it difficult if not impossible to detach. The wrapping generally remains within the component since it cannot be dissolved by the solvent, generally water, and it would be too expensive to remove mechanically. In another advantageous design of the invention, the moldable mass of the core is surrounded with wrapping that does indeed withstand resin, but that is soluble. Furthermore, if it withstands the solvent of the moldable mass, it may be removed appropriately in a separate detachment step. Nevertheless, it is advantageous for it to be dissolved with the same solvent as the moldable mass, and thus together therewith. It needs to be capable of withstanding resin but soluble in water when the moldable mass is detached using water as a solvent that is simple and that does not raise problems. It then presents the advantage of the moldable mass of the core being detachable in a manner that is simple in a method that is easy to operate, but with the wrapping also being detachable, unlike the present state of the art, and being suitable for eliminating during the same treatment step and not in a complicated mechanical method step.

The object initially mentioned is achieved with the above-mentioned device for fabricating fiber-reinforced plastics components or components based on fiber-reinforced material using a mold core that is wrapped in gastight manner, in which an inside pressure arises in the mold core during the fabrication method by means for adjusting essentially a balance across the plastics component or the fiber semi-finished product between ambient pressure and the inside pressure resulting from the mold core and the space inside the component. The device thus vents the outside shape of the core changing as a result of pressure unbalance, in particular as a result of excess pressure inside the core. For example, it may lose its indentations, thereby deforming the future plastics component.

In a first advantageous design of the device in accordance with the invention, the pressure-tight wrapper may be made so as to be pressure-stable. As a result, in spite of applied pressure inside the core, this prevents loading effects occurring and thus prevents deformation of the fiber semi-finished product. Without an external tool that could accommodate forces resulting from pressure inside the core, the pressure inside the core lacks an abutment or counterpressure, so it runs the risk of deforming the fiber semi-finished product. The pressure-stable wrapper is thus made in such a manner as to be able to accommodate the pressure forces that result from the pressure inside the core.

In a first advantageous variant of the pressure-stable wrapper, it may be securely fastened to the mold core. It may be fastened by adhesive bonding, e.g. to the mold core, or it may be anchored at spots or lines to the material of the mold core by suitable anchor elements. Thus, the mold core carries the wrapper such that the wrapper could be made thinner. This is advantageous, in particular when the wrapper remains inside the future plastics component, even though the core is removed.

An alternative of this embodiment may consist in the wrapper that is proof against pressure itself being made so as to be sufficiently pressure-stable to avoid transmitting forces to the core. In this variant, the material of the mold is of little importance, and it does not need to be very strong. Furthermore, there are no problems of physical or chemical bonding between the core and the wrapper. However the wrapper needs to be made so as to be stronger.

The above-mentioned devices thus apply the principle of leaving the pressure that forms inside the core unchanged and of accommodating it by means of the wrapper that withstands it so that the mold core does not deform overall. In an advantageous alternative design of the device in accordance with the invention, the device may present means for reducing the pressure inside the core. This variant thus applies the principle of reducing a pressure that is building up so as to avoid the wrapper expanding and deforming. This also makes it possible to reestablish a balance across the fiber semi-finished product or the plastics component. The wrapper does not need to be made so as to be as stable as with the above-described variant.

In an advantageous design of this variant, the mold core may comprise a wrapper that is gastight and pressure-proof in the context of the application, and that is fitted with a pressure-tight coupling suitable for passing through the future plastics component or fiber semi-finished product. As a result, the space inside the core can be connected to the surroundings in a fluid-conveying manner such that the inside pressure can be controlled from the outside. The pipe coupling may be guided to the outside of the fiber semi-finished product or of the plastics component so that pressure balance can be established without any other intervention merely by the pressure inside the core being allowed to expand. It is also possible for the connection to be controlled by valves and a vacuum pump in a manner that is targeted in time and magnitude such that a small amount of suction is established inside the core, thereby causing the pressure-tight wrapper to be pressed particularly closely against the mold core. In this variant, the pressure inside the core may be controlled from the outside at any time and likewise throughout hardening, so as to make it possible to respond immediately to a change of pressure inside the core.

In another advantageous design of the invention, the mold core may be surrounded in pressure-tight manner and may be subjected to an at least partial vacuum so that the pressure-tight wrapper surrounding the core is not only sucked closely against the outline of the mold core, but suction is established that corresponds at least to the expected increase of pressure in the core. Fabricating an evacuated mold core is technology that is already known and easily controlled, so it does not represent an excessive expense. It presents the advantage that the pressure-tight wrapper does not need to be pierced, so no defects appear at the location of a discontinuity.

In another advantageous design of the invention, the fabrication device may include a device for raising ambient pressure while the plastics component is hardening. This may be constituted by a pressure chamber in which a vacuum structure is placed, for example. If temperature and pressure are needed for the purpose of hardening the resin, it is possible to use an autoclave. The pressure applied for hardening generally suffices as a counterpressure against the pressure that becomes established inside the core. When ambient pressure is applied, the fabrication structure for making the plastics component may remain largely unchanged. There is no need for the core to be expensive to fabricate, for additional measures, or for additional pipes on the core.

Nevertheless, the wrapper has the function of protecting the moldable mass of the core during fabrication of the component against penetration by resin. In other words, particularly when using moldable masses with open pores, it might become difficult to detach them, and a non-plane and unwanted inside surface could be formed on the component. According to another advantageous design of the invention, the wrapper may be based on a material that withstands resin but that is soluble. As a result, the wrapper may likewise be removed by being detached in simple manner during the method, even if it achieves a weight saving that its only small. The wrapper may be detached by a solvent other than that used for the moldable mass so that the two detachment processes can be separated. Advantageously, the wrapper is nevertheless soluble in the same manner as the moldable mass, such that they can be removed together in a single step. The simplest solvent is water, which is why the wrapper may be made in a manner that does indeed withstand resin but that is soluble in water.

The objects of the invention are also achieved by means of a component based on fiber-reinforced material, obtained by the method as described above. By way of example, the FRP component constitutes a pre-forming element suitable for use in constructing a structure that is more complex.

The objects of the invention are also achieved by means of a component based on a fiber-reinforced material for use in constructing a structure that is more complex and that is obtained by the above-described method.

The principle of the invention is explained below by way of example in even greater detail with the help of drawings. In the drawings.

Elements that are structurally and functionally identical are given a single and unique reference on going from one figure to another and there is no need to describe them in detail for each of the figures in which they appear.

Figure 1:
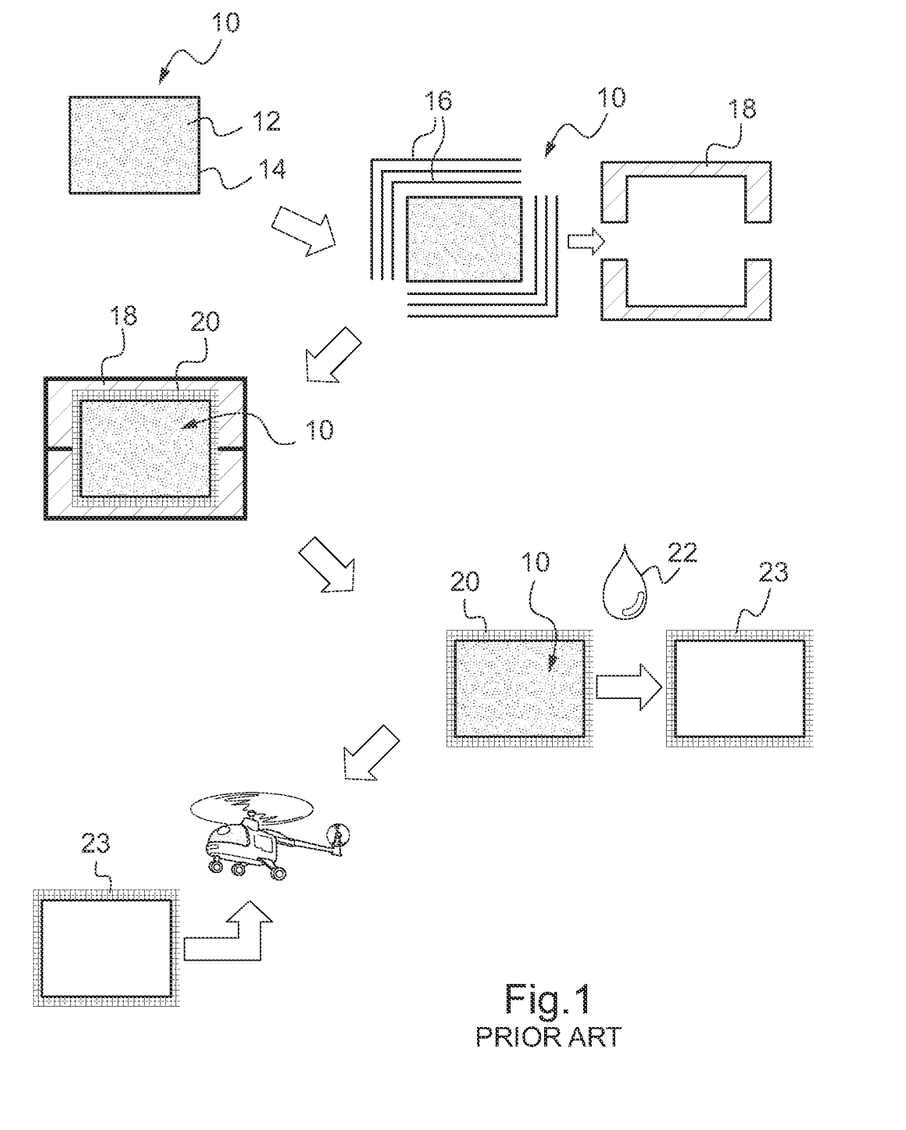
FIG. 1 is a diagrammatic representation of a prior art fabrication method.

A method and a device for fabricating a hollow body based on fiber reinforced plastics material (FRP) are explained briefly with reference to the simplified diagrammatic representation of FIG. 1. The starting point is a mold core 10 that is wrapped and soluble in water, being based on a water-soluble moldable mass 12 and a water-resistant wrapper 14. The function of the wrapper 14 is to surround the water-soluble moldable mass 12 in liquid-tight manner. It vents liquid material, that would otherwise be lost from forming the component and would make unmolding of the mold core 10 difficult, from penetrating into the moldable mass 12 during the consecutive fabrication process. As an internal tool, the mold core 10 is subsequently surrounded by individual layers of a fiber semi-finished product 16. For the invention, it matters little whether this operation is performed mechanically or by machine, or whether the fiber semi-finished product is or is not already preimpregnated with resin. The wrapped mold core 10 is subsequently inserted in a two-sided molding tool 18 which, as the outer tool, determines the outside shape of the future FRP component. After the two halves of the molding tool 18 have been closed around the mold core 10 surrounded by the fiber semi-finished product 16, the semi-finished product 16 is preimpregnated with a resin, insofar as resin is not already sent in a preimpregnated material. The resin may be sucked into the fiber semi-finished product 16 under pressure, e.g. in the vacuum method, or it may be injected in the applied pressure method.

Thereafter, the entire fabrication structure, i.e. in particular the molding tool 18, the resin-impregnated fiber semi-finished product 20, and the mold core 10 are heated so as to harden the resin. Similarly, the water-soluble moldable mass 12, and in particular the air included therein, expand under the effect of the raised temperature. The mold core 10 thus increases in volume insofar as the gas included in the core is prevented from escaping through the gastight wrapper 14. Any escape through the wrapper 14 is generally undesirable, since that can happen only via the resin impregnated fiber semi-finished product 20, which would increase the porosity thereof in unwanted manner as a result of gas passing through it during the fabrication process. Nevertheless, the closed molding tool 18 provides resistance to the increase in the pressure coming from the mold core 10 without leaving any possibility for the gas to expand, such that the future FRP component is never subjected to unwanted deformation in terms of its outside dimensions.

After the hardening process has been completed, the future FRP component has its final outside shape. It is then extracted from the molding tool 18 and still needs further treatment in order to eliminate the mold core 10. For this purpose holes (not shown) are made through the fiber semi-finished product 20 that is impregnated with hardened resin, for the purpose of dissolving and washing away the soluble mold core 10 with a suitable solvent 22. After the mold core 10 has been removed, a terminated FRP component 23 is available for subsequent treatment. As shown in FIG. 1, the moldable mass 12 and its wrapper 14 may be removed from the FRP component 23. Depending on the material and the design of the wrapper 14, it may alternatively remain within the FRP component 23 where it forms an inside surface of the component 23. The FRP component 23 is mounted after the treatment and possibly after further treatment at its destination site, e.g. in a helicopter.

Figure 2:
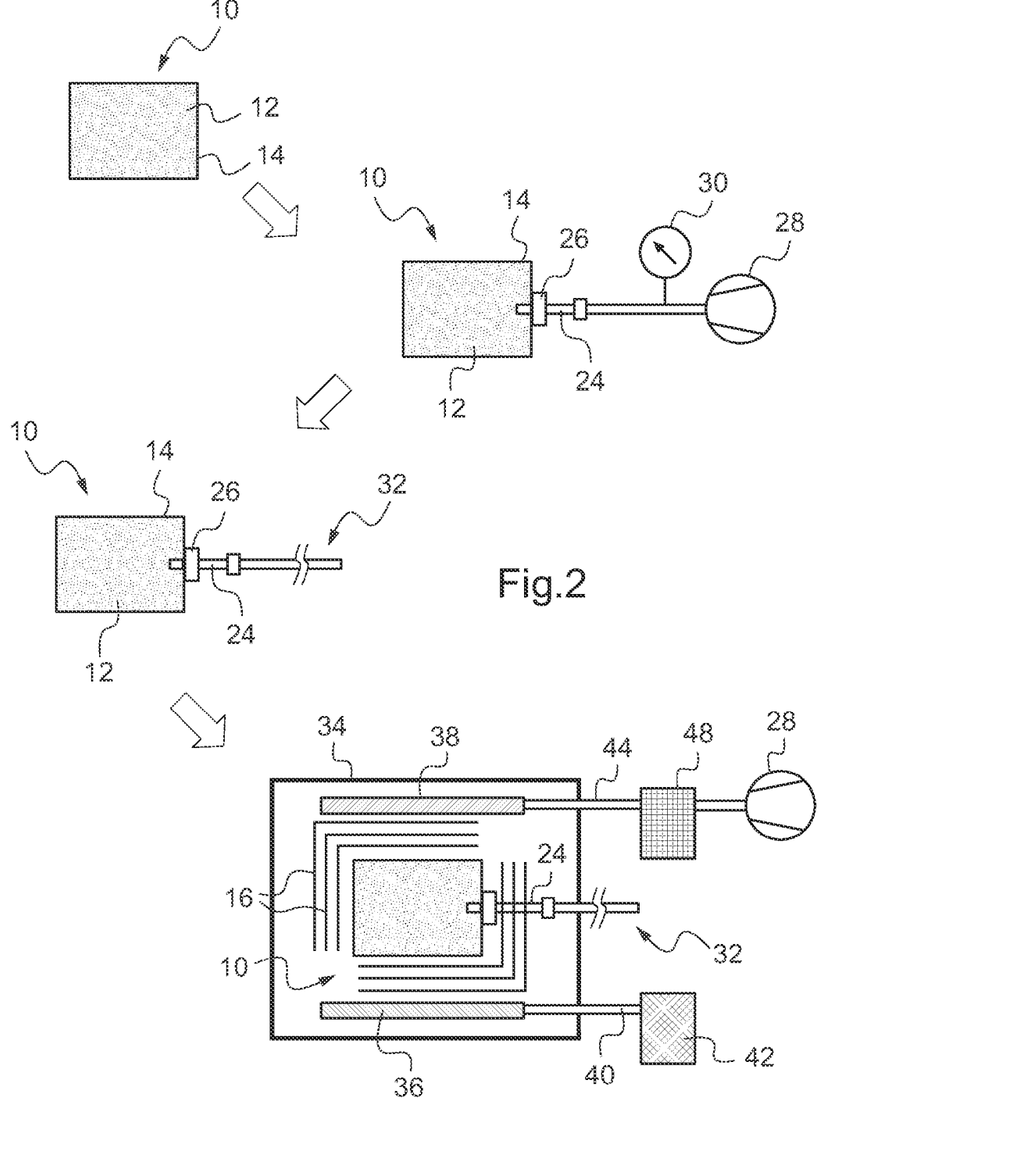
FIG. 2 shows fabrication in accordance with the invention by means enabling the pressure inside the core to be controlled.

FIG. 2 shows a first implementation of fabrication in accordance with the invention. It applies the principle of influencing the pressure inside the mold core 10. For this purpose, a prior art mold core 10 made up of a soluble moldable mass 12 and a pressure-tight wrapper 14 is used. The mold core 10 receives a pipe coupling 24 that establishes a fluid flow connection through the wrapper 14 to the inside space of the mold core 10. The pipe coupling 24 is sealed relative to the wrapper 14 by a gasket 26.

Thereafter, a vacuum pump 28 and a pressure gauge 30 are connected to the pipe connection 24. The vacuum pump 28 generates suction in the core 10 of magnitude indicated by the pressure gauge 30. In order to verify the sealing of the mold core 10 and its wrapper 14, the suction generated is maintained for a defined length of time and verified by a pressure gauge 30 in order to determine whether it is conserved. If the determined pressure level inside the core lies below a set limit value or within the limits of a predefined tolerance range, then the core 10 is suitable for use in fabricating the FRP component. As a result, defective or unsuitable cores 10 can be eliminated, thereby avoiding components being discarded. The quality of the fabrication process can thus be guaranteed at an early stage.

Mold cores 10 that have had their sealing checked successfully are then connected to a pipe system 32 of the pressure system in order to fabricate the fiber-reinforced component, which component is not shown in FIG. 2 other than in the form of a highly simplified symbol.

Thereafter, the production structure for fabricating the FRP component is pared. For this purpose, the mold core 10 is initially surrounded in the fiber semi-finished product 16. The mold core 10 fitted in this way is inserted in a vacuum structure, housing a resin injection manifold 36 and suction manifold 38 under a vacuum film 34 beside the mold core 10. The injection manifold 36 and the suction manifold 38 are disposed relative to the mold core 10 on facing sides. The injection manifold 36 is connected via a pipe 40 to a resin tank 42. The suction manifold 38 is in fluid flow connection via a pipe 44 and a resin trap 48 with a vacuum pump 28. The pipe coupling 24 on the mold core 10 is also guided from the zone of the evacuated film 34 and thus establishes a connection with the pressure system 32 that is shown diagrammatically only.

Thereafter, fabrication of the molded part is implemented in known manner by a vacuum infusion method. The suction resulting from the vacuum pump 28 sucks the resin from the resin tank 42 via the injection manifold 36 through the fiber semi-finished product 16 and towards the suction manifold 38. The resin trap 48 prevents resin from penetrating into the vacuum pump 28 once the fiber-based product 16 is completely impregnated with resin. After resin has been introduced into the layers of the fiber semi-finished product 16, the temperature is increased in order to harden the resin during a later step of the method. As described above for the prior art method shown in FIG. 1, the volume of the mold core 10 expands as a result of the expansion of the gas it includes, in particular air. In the production structure shown in FIG. 2, there is nevertheless no outer tool suitable for establishing counterpressure to ensure that the mold core 10 and the fiber semi-finished product 16 surrounding it retain their additional shape. According to the invention, instead of doing that, the pressure inside the mold core 10 is diverted by the pipe coupling 24 into the environment outside the vacuum structure under the vacuum film 34. The gas can expand and be discarded without other intervention. The pressure inside the core 10 is consequently practically the same as the pressure in the surroundings. Where appropriate, it is even possible to generate suction inside the mold core 10 so as to guarantee that the wrapper 14 is reliably positioned on the moldable mass 12, thereby avoiding any unwanted shape errors due to a wrapper 14 that is wrinkled or dented.

After the resin in the resin-impregnated fiber semi-finished product 20 has hardened to form a laminate, the FRP component can be removed from the vacuum structure and released in conventional manner of the soluble mold core 10.

Figure 3:
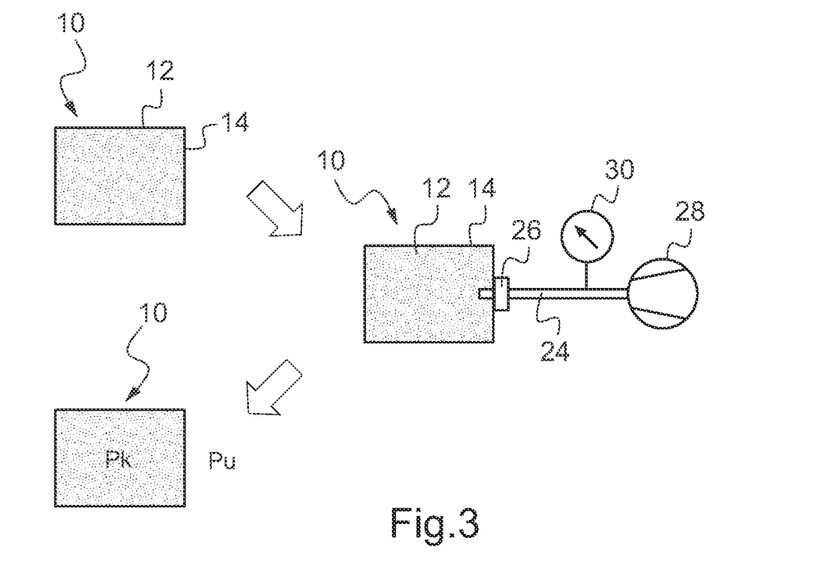
FIG. 3 shows fabrication by means of an evacuated mold core.

An alternative implementation of fabrication is shown in FIG. 3. Once more, the starting point is likewise a mold core 10 that is wrapped in fluid- and pressure-tight manner. It is likewise fitted with a pipe coupling 24 that is sealed relative to the wrapper 14 by a gasket 26. A vacuum pump 28 with a pressure gauge 30 is connected thereto. The mold core 10 is then thoroughly evacuated by means of the vacuum pump 28. This generates a pressure $p_k$ inside the core 10 that is less than ambient pressure $p_u$. The steps of the process for warping the moldable mass 12 with the wrapper 14 and evacuating the mold core 10 must not take place in consecutive manner, but may be performed in parallel as in the known vacuum welding technique for mold cores. The mold core 10 as fabricated in this way is then inserted into the vacuum structure as shown in FIG. 2. Unlike FIG. 2, there is no pipe coupling of the kind that, in FIG. 2, passes through the vacuum structure and therefore needs to pass through the vacuum film 34. Thus, it is possible to eliminate numerous steps that are subject to error, in particular concerning the sealing of the vacuum film 34 to allow the pipe to pass through.

The magnitude of the pressure $p_k$ inside the core is adjusted by evacuating the mold core 10 in such a manner that even with a subsequent increase in temperature for hardening the resin in the vacuum structure, there is no possibility of the pressure inside the core giving rise to a change in the shape of the mold core 10.

The fabrication methods and devices described above make use of a principle that consists in preventing pressure becoming established inside the core by reducing the pressure inside the mold core 10 and thus obtaining pressure conditions that are substantially in equilibrium on the fiber semi-finished product 16 or 20. This is because using balanced pressure conditions inside and outside the future FRP component, there is no possibility of obtaining unwanted deformation due to a pressure difference being established.

Figure 4:
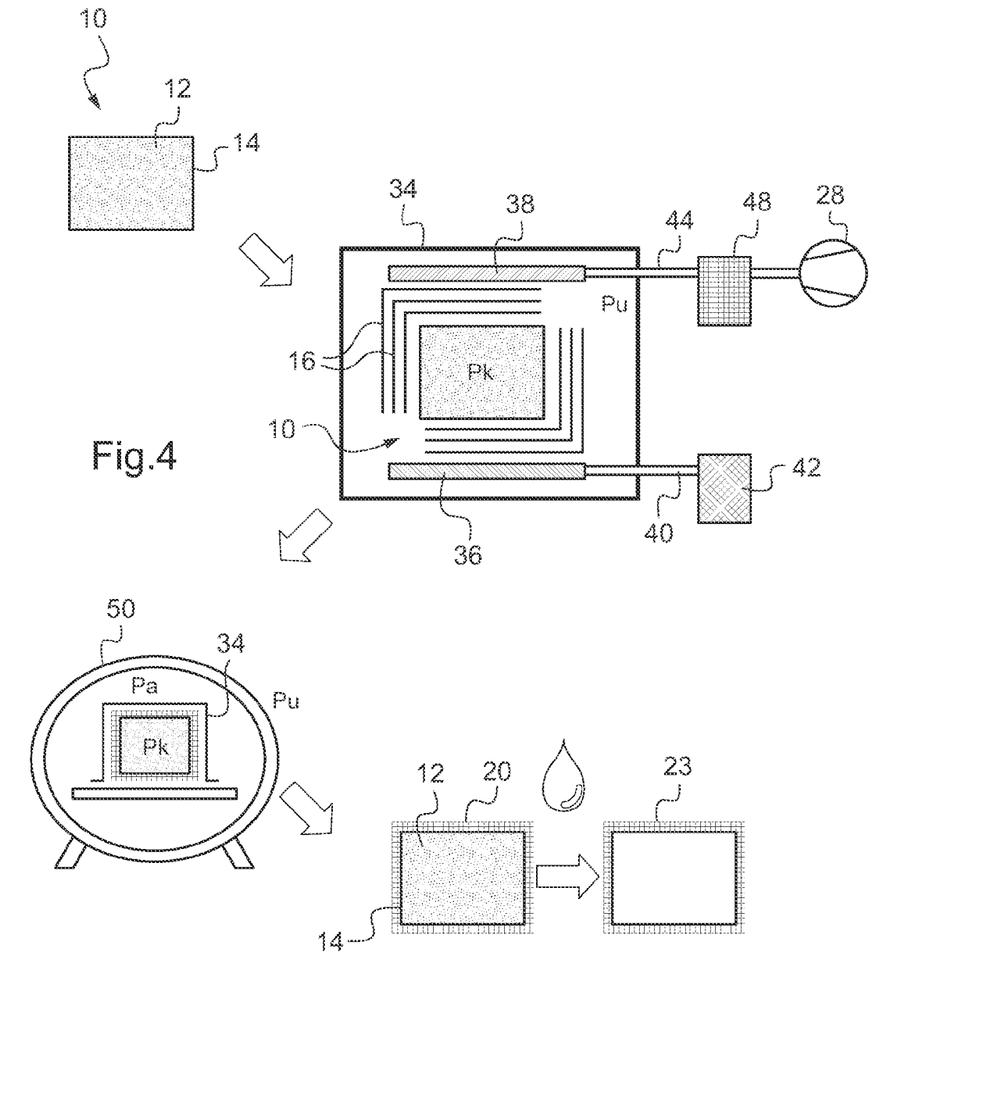
FIG. 4 shows fabrication in an autoclave.

In contrast, the implementation shown in FIG. 4 makes use of a different principle whereby a counterpressure is established against the pressure inside the core. The mold core 10 wrapped in fluid- and pressure-tight manner is consequently incorporated and processed in the known vacuum structure under the vacuum film 34 as described above with reference to FIGS. 2 and 3, but with the following difference: hardening now takes place in parallel with a rise in temperature and also a rise in pressure in an autoclave 50. This method is already known, however it is used as a supplement to oppose an autoclave pressure $p_a$ that is at least as great as the pressure $p_k$ inside the core. During testing, using a hardening temperature of 180° C. and under normal conditions, a variation in the pressure $p_k$ inside the core of 500 mbars has been observed. For the autoclave pressure $p_a$, a pressure of 2 bars was selected, i.e. a pressure well above the pressure needed.

Also with the autoclave pressure $p_a$, it is possible to obtain pressure conditions that are substantially balanced in the fiber semi-finished product 16 or 20, thereby including any unwanted deformation in the future FRP component. Unlike the method described above, pressure equilibrium then occurs at a significantly higher level, i.e. not less than the level of the pressure $p_k$ inside the core. After the future FRP component has hardened in the autoclave under pressure and temperature, and after the final forming of the FRP component 23, it is withdrawn, with the core being detached, and the component is mounted as described.

Figure 5A:
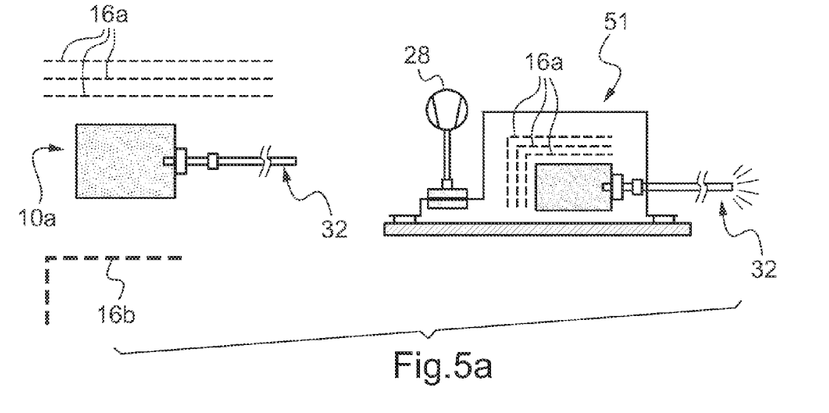
FIGS. 5a and 5b are diagrams showing an implementation of the fabrication method of the invention relating to making and using pre-forming elements.

FIG. 5a shows an implementation of the method in accordance with the invention for making fiber semi-finished products. Thus, after making a sealed core 10a and connecting said core 10a to the pressure pipe system 32, the sealing of said core 10a is verified. Those steps are themselves known.

Pre-forming is then performed by using the core 10a in association with a pressure balancing system using the pressure pipe system 32. Thereafter the dry fiber semi-finished product 16, e.g. associated with a bonder in powder form, are placed on the core 10a so as to perform vacuum pre-forming while applying a suitable temperature. It is preferable to use a vacuum system 51 of conventional type having the core 10a covered in dry fiber semi-finished products 16a placed therein.

At the end of these steps, a dry fiber pre-forming element 16b is obtained.

One or more of these dry fiber pre-forming elements 16b is/are then placed on the core 10 inside a vacuum system 51 of the evacuated film kind, as described above. Thus, in FIG. 5b, the fiber pre-forming elements 16b advantageously replace the fiber semi-finished product 16 of FIG. 2. The steps relating to vacuum infusion of the resin and to solidification are likewise performed again in this particular application. The same applies to dissolving the moldable mass 12.

Figure 5B:
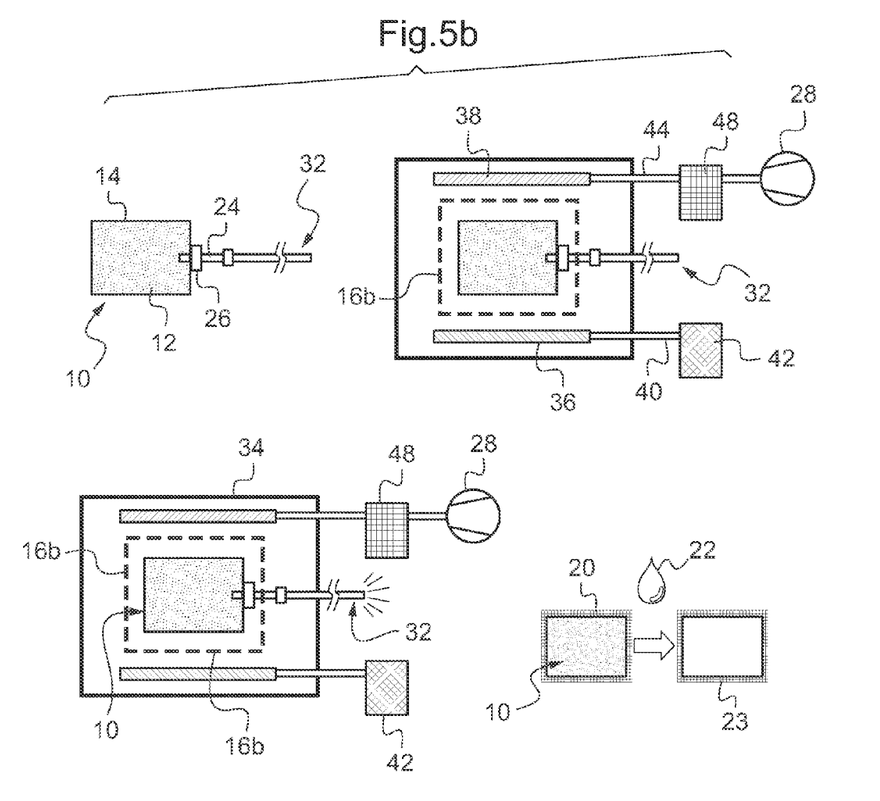

The fiber pre-forming elements 16b are stable and make it easier to construct structures that are more complex and that are subsequently subjected to resin infusion.

In the context of the invention, it is thus possible to perform pre-forming operations while using sealed cores 10a. By way of example, the pre-forming element 16b may be intimately associated with the sealed core 10a.

LIST OF REFERENCES 10, 10a mold core
12 moldable mass
14 wrapper
16 fiber semi-finished product
16a dry fiber semi-finished product
16b fiber pre-forming element
18 molding tool
20 resin-impregnated fiber semi-finished product
22 solvent
23 fiber-reinforced plastics or synthetic component
24 pipe coupling
26 gasket
28 vacuum pump
30 pressure gauge
32 pressure pipe system
34 vacuum film
36 injection manifold
38 suction manifold
40 pipe
42 resin tank
44 pipe
48 resin trap
50 autoclave
51 vacuum system
$p_k$ pressure inside core
$p_a$ autoclave pressure
$p_u$ ambient pressure

What is claimed is:

1. A method of fabricating components based on fiber-reinforced plastics material, in particular with the help of a wrapped mold core, the method comprising the following steps:
    a) fabricating the mold core from a moldable mass;
    b) wrapping the mold core with a wrapper that withstands resin and is gastight;
    c) applying fiber semi-finished products to the wrapped mold core and introducing resin to create the plastics component; and
    d) hardening the plastics component under the effect of temperature;
    wherein, under all circumstances, in step d), the pressure ($p_k$) inside the core is reduced to establish substantial pressure equilibrium between ambient pressure ($p_u$) and the pressure ($p_k$) inside the core across the fiber semi-finished product.

2. A method according to claim 1, wherein excess pressure that arises inside the core is exhausted into the environment, in particular during the hardening of step d).

3. A method according to claim 1, wherein suction is established inside the wrapper after the mold core has been wrapped.

4. A method according to claim 1, wherein an ambient pressure ($p_u$) of at least appropriate value is applied during step d) during the establishment of pressure ($p_k$) inside the core.

5. A method according to claim 1, wherein the mold core is wrapped in step b) with a pressure-stable wrapper.

6. A method according to claim 5, wherein the wrapper is securely fastened to the core.

7. A method according to claim 5, wherein the wrapper is made to be sufficiently self-stable.

8. A method according to claim 1, wherein the resin-withstanding wrapper is detached with a solvent.

9. A method of fabricating components based on fiber-reinforced plastics material, with the help of a wrapped mold core, the method comprising the following steps:
    a) fabricating a mold core from a water-soluble moldable mass, the mold core having an inside;
    b) wrapping the mold core with a water-resistant and gastight wrapping to form a wrapped mold core;
    c) applying fiber semi-finished products to the wrapped mold core to form a fiber applied wrapped mold core;
    d) placing the fiber applied wrapped mold core in a mold;
    e) introducing resin into the mold to create a plastic component; and
    f) hardening the plastic component under the effect of temperature to form a hardened component;
    wherein, under all circumstances, in step f), the pressure ($p_k$) inside the core is reduced to establish substantial pressure equilibrium between ambient pressure ($p_u$) and the pressure ($p_k$) inside the core.

10. The method of claim 9 further comprising (g) removing the hardened component from the mold and eliminating the mold core.

11. The method of claim 9 wherein substantial pressure equilibrium is established by providing fluid communication between the inside of the core and an area outside of the mold.

12. A method of fabricating components based on fiber-reinforced plastics material, the method comprising:
    a) providing a fiber semi-finished product comprising a wrapped mold core of water-soluble molded mass surrounded by water-resistant and gastight wrapping and fiber;
    b) placing the fiber semi-finished product in a mold;
    c) introducing resin into the mold to create a plastic component;
    d) hardening the plastic component under the effect of temperature while reducing pressure ($p_k$) inside the mold core to establish a substantial pressure equilibrium between ambient pressure ($p_u$) and the pressure ($p_k$) inside the mold core across the fiber semi-finished product to form a hardened component;
    e) removing the hardened component from the mold; and
    f) dissolving the mold core to eliminate the mold core from the hardened component.

* * * * *